US 008046389B2

(12) United States Patent
Ritter

(10) Patent No.: US 8,046,389 B2
(45) Date of Patent: Oct. 25, 2011

(54) AUTOMATIC DATA DETERMINATION

(75) Inventor: Gerd M Ritter, Heidelberg (DE)

(73) Assignee: SAP AG, Walldorf (DE)

( * ) Notice: Subject to any disclaimer, the term of this patent is extended or adjusted under 35 U.S.C. 154(b) by 367 days.

(21) Appl. No.: 11/615,282

(22) Filed: Dec. 22, 2006

(65) Prior Publication Data

US 2008/0154854 A1 Jun. 26, 2008

(51) Int. Cl.
*G06F 17/30* (2006.01)

(52) U.S. Cl. ........ 707/805; 707/706; 707/713; 707/722; 707/736; 707/758; 707/781; 707/791; 707/802; 707/803; 707/809; 713/183; 713/184; 726/17; 726/18; 726/19; 52/741.1; 715/804; 715/825; 715/781; 705/50

(58) Field of Classification Search .................. 52/741.1; 715/764, 804, 825, 781; 707/102, 706, 713, 707/722, 736, 758, 781, 791, 802, 803, 805, 707/809, 999.1, 999.101, 999.102, 999.103, 707/999.107; 713/183, 184; 726/17, 18, 726/19; 705/50
See application file for complete search history.

(56) References Cited

U.S. PATENT DOCUMENTS

| 5,367,619 | A | * | 11/1994 | Dipaolo et al. | 715/221 |
| 7,430,517 | B1 | * | 9/2008 | Barton | 705/7 |
| 2001/0032152 | A1 | * | 10/2001 | Khosla et al. | 705/27 |
| 2002/0077978 | A1 | * | 6/2002 | O'Leary et al. | 705/40 |
| 2002/0120568 | A1 | * | 8/2002 | Leblang et al. | 705/40 |
| 2002/0152163 | A1 | * | 10/2002 | Bezos et al. | 705/40 |
| 2003/0120554 | A1 | * | 6/2003 | Hogan et al. | 705/26 |
| 2004/0205026 | A1 | * | 10/2004 | Shah et al. | 705/50 |
| 2004/0263480 | A1 | * | 12/2004 | Pagan | 345/172 |
| 2005/0091609 | A1 | * | 4/2005 | Matthews et al. | 715/804 |
| 2005/0144895 | A1 | * | 7/2005 | Grimes et al. | 52/741.1 |
| 2006/0107224 | A1 | * | 5/2006 | Friend et al. | 715/764 |
| 2007/0174230 | A1 | * | 7/2007 | Martin | 707/1 |
| 2007/0234063 | A1 | * | 10/2007 | Ueda et al. | 713/183 |

OTHER PUBLICATIONS mcSAP CRM 5.0 product information, product release, Aug. 2006.

* cited by examiner

*Primary Examiner* — Syling Yen
(74) *Attorney, Agent, or Firm* — Fish & Richardson P.C.

(57) ABSTRACT

In a computing system, a value that a user enters under guidance of a graphical user interface may be received for association with a field of a document. The received value is used to determine a value to be automatically associated with at least another field of the document. Information indicating the value received in the input field and a rule used in determining the value for the at least another input field are stored in one or more fields of the document associated with the at least another input field.

23 Claims, 7 Drawing Sheets

AUTOMATIC DATA DETERMINATION

TECHNICAL FIELD

This document relates to automatic data determination in an electronic computing system.

BACKGROUND

Computer applications running on computer systems can often interact with users in a variety of ways. For instance, a computer application may include a graphical user interface that may manage interaction with a user. The user interface may receive information from the user, who may enter such information using an input device. Some common input devices include a keyboard, mouse, trackball, stylus, joystick, etc. The user interface may also present information to the user on an output device, such as a display screen or a printer. Some computer applications contain documents that include multiple fields for receiving user-entered data values. A user may manually enter a data value in each of the fields.

Some application programs may take a user-entered value and generate another data value for the document. The application may temporarily store information pertaining to the determination in another document, such as an application log of a predetermined size, where log entries are overwritten by new entries after a certain period of time or as new entries are made. If the user is interested in viewing the information, the user may stop working in the present document and may open the another document, and may then search through various log entries to try and find information pertaining to the determination at issue. However, the user may not wish to stop working in the present document and may also not wish to open the another document. Moreover, if the user waits too long to open the another document, the information may have been overwritten by additional log entries.

SUMMARY

This document relates to automatic data determination and association of the determined data with information pertaining to the determination.

In a first general aspect, a method includes receiving a value that a user enters under guidance of a graphical user interface for association with a field of a document. The method also includes determining, using the received value, a value to be automatically associated with at least another field of the document. The method further includes storing, in one or more fields of the document associated with the at least another input field, information indicating (i) the value received in the input field, and (ii) a rule used in determining the value for the at least another input field.

In selected implementations, the determined value may be displayed in the graphical user interface in the at least another input field of the document. At least a portion of the stored information may be displayed in the graphical user interface when the user makes a selection. A tool tip may be displayed in the graphical user interface, and the selection may include hovering a pointing indicator in the user interface over the tool tip.

In selected implementations, the determined value may be an attachment. The rule may include a plurality of rules, which may be applied consecutively to determine the value to be automatically associated with the at least another field of the document. A subsequent decision may be made based on the rule or on at least a portion of the stored information. After displaying the determined value, a value that a user enters under guidance of the graphical user interface may be received, and the determined value may be replaced with the user-entered value. A value to be automatically associated with at least another field of the document may be received from an external system, and information indicating a rule used in determining the value for the at least another input field may be stored in one or more fields of the document associated with the at least another input field, the information received from the external system.

In a second general aspect, a graphical user interface for obtaining a query for searching a data repository comprises at least one input field that is capable of receiving a user-entered value for association with the input field in a document. The user interface also comprises at least another field of the document that is capable of being associated with an automatically generated value that is generated using the received value. The at least another field of the document is associated with one or more fields of the document where information is stored that indicates (i) the value received in the input field, and (ii) a rule used in determining the value for the at least another input field.

Advantages of the systems and techniques described herein may include any or al I of the following: Improved access to information, an improved user interface that may save a user time and may reduce occurrences of data-entry errors, more efficient data determination, an ability to quickly, easily and efficiently view information pertaining to determined data, improved decision-making capability.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
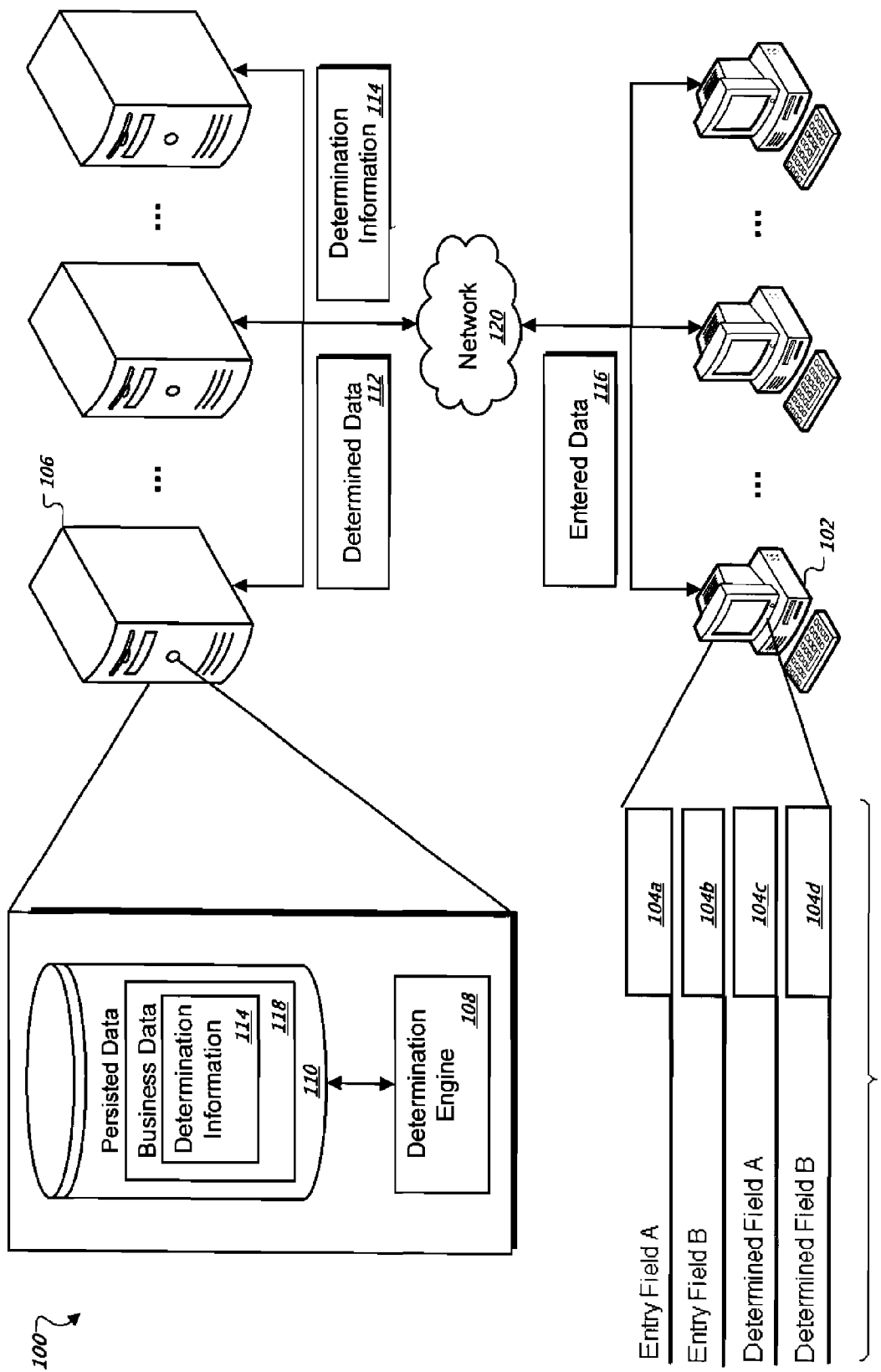
FIG. 1 is a block diagram of an exemplary system that includes an exemplary determination engine that can be used for automatic data determination and for association of the determined data with information pertaining to the determination.

FIG. 1 is a block diagram of an exemplary system 100 that includes an exemplary determination engine that 108 can be used for automatic data determination and for association of the determined data with information pertaining to the determination. In an implementation, a user may use the system 100 shown in FIG. 1 to enter information, such as a data value, under the guidance of a user interface. In an implementation, the data value may be associated with an attribute of an object. Such data may be entered, for example, into an input field of a document being used in an application program. The system 100 may receive the data and associate the data with a field of the document, and may determine additional information, such as an additional data value, using the received data. The additional data value may be persisted and automatically associated with another field of the document, and may be displayed in the graphical user interface. In some implementations, the determined data value may be associated with more than one field of the document. In other implementations, the system 100 may determine more than one additional data value using the received data, and may associate each of the additional data values with one or more fields of the document. In this manner, the system 100 may automatically and efficiently determine appropriate values for data fields in a document based on a user-entered data value, thereby relieving the user of having to manually or otherwise enter appropriate values for the data fields. This may permit the user to save time and may reduce occurrence of data-entry errors.

In an implementation, the system may apply a rule to the received data in determining the additional information. The received data, the rule, or both, may be stored in one or more fields of the document associated with the field of the determined data. That is, the determination information may be stored inline with the transactional data that is persisted, according to some implementations. This stored information may be displayed in the user interface and may be used for subsequent system processing. In this fashion, the user or the system may have convenient access to information describing aspects related to the determination of the determined information, which may be useful for subsequent processing or decision-making.

In addition to data determination by the system, data fields may also be determined or set from outside the system. For example, a user may enter a value into a field, including into a field that had previously been populated with system-determined data. As another example, a field may be set by data contained in a message. For example, one or more fields of a sales order may be determined by information contained in a received message. The received message may have been sent from outside of the system, according to some implementations. In an implementation, the received message may contain a location that may be used to populate a field of the sales order. The location, in this example, may be determined outside of the system according to one or more relevant rules, statistics, information, or checks, such as availability, qualifications, competence, experience, etc. In such a case, determination information may indicate that the field was "determined externally by availability," for example.

In the exemplary implementation shown in FIG. 1, the system 100 includes one or more server devices 106 and one or more client devices 102 communicably connected to the servers 106 over a network 120. While multiple server devices 106 and client devices 102 are shown in the example of FIG. 1, it will be appreciated by one skilled in the art that techniques described herein may be performed in a system including a single server device 106 or a single client device 102, or may alternatively be performed by a system comprising a standalone computing device, such as a personal computer. In general, a client device 102 can execute an application program that includes a graphical user interface (GUI) 104, and a user can enter data under the guidance of the graphical user interface 104. In some implementations, the application program may be stored in a server device 106, while in other implementations the application program may be stored locally on a client device 102. Similarly, the application program may be executed either at the server end or the client end, or according to a combination of the two. For example, the clients can execute a mySAP® application available from SAP (Walldorf, Germany).

In an implementation, the application program may include a document, and the application may allow the user to enter data into the system 100. In the example system 100, entered information can be used to determine additional information that can be added to the document by the system 100. For example, the user can use a keyboard to type a string into the GUI 104, specifying an input data value for the illustrative "Entry Field A" field 104*a*, the "Entry Field B" field 104*b*, or both. As is conventional, the user can also use other user interface devices (e.g., a mouse, stylus, or the like) to enter input data. Data entered by the user can be sent to the server 106 as entered data 116. As shown in the exemplary system 100 of FIG. 1, the entered data 116 may be stored at a client device 102. Alternatively, the entered data may be stored on a server device 106 or in a data repository external to either the server 106 or the client 102, In an implementation, the server device 106 can use the determination engine 108 to automatically generate determined data. For example, the determination engine 108 can generate determined data 112. In general, the determination engine may reside on one or more server devices 106 or on a client device 102. In some implementations, one or more component modules of the determination engine may be located on a server device 106 and one or more such modules may be located on a client device 102. The determination engine 108 can access persisted data 110 in the system 100. The persisted data 110 may be stored, for example, in one or more database repositories located in the system 100. In the example of FIG. 1, the persisted data 110 is shown stored in a repository within the server 106. For example, the determination engine 108 can use persisted data 110 describing a business process or a sales form to generate the determined data 112. The persisted data 110 can also include rules which can specify how the entered data 116 and the persisted data 110 are processed. For example, a rule can specify which data elements can be derived from the entered data 116, and can specify a procedure for obtaining determined data from entered data.

In an implementation, the server 106 can also use determination engine 108 to generate determination information 114. The determination information 114 can specify how the determined data 112 was generated. In one example, a user may be a field sales representative, and may be entering data into a document in an application program that tracks various sales activities for a particular business. The user may enter a data value, for example, that describes information pertaining to a buyer in a recent sales transaction. In an implementation, the system 100 may automatically determine an additional data value from the entered value. For example, a "bill-to party" may be determined, which data value may indicate a party to which a bill for the recent transaction should be sent. In one implementation, a data value may be copied to get determined data from entered data. In this case, the determination information 114, which may describe how the generated or determined data was determined from the entered data, may be "copied from entered buyer information," for example. As another example, an employee responsible for a given task or for servicing a given buyer's account may be derived from an address of the buyer via responsibilities. For instance, if the buyer's address falls within a particular employee's sales territory, the employee may be derived from examination of the address and identifying that it falls within the sales territory.

Data entered by the user can be stored in the persisted data 10. For example, the data entered by the user can be stored as business data 118. The determined data 112 can also be stored in the persisted data 110. For example, the determined data 112 can be stored as business data 118. The system 100 can also store the determination information 114. For example, the determination information 114 can be stored inline with the business data 118 (i.e., the manner in which the determined data 112 was generated may be stored with the business data 118). Using the determination engine 108, the system 100 can generate determined data 112 and determination information 114 in real time. The entered data and the determination information can also be associated with the determined data, such as by storing the entered data and determination in one or more fields of the document that are associated with the field corresponding to the determined data. In some implementations, a database record may be updated to include the determined data, the entered data, and the determination information. Thus, each of the entered value, determined value, and determination information may be stored in association with one another within the document, such that access for later reference, as for subsequent processing, may be streamlined. The determination engine 108 is described in more detail below with reference to FIG. 2.

The network 120 can be implemented using various communication protocols. For example, the network 120 can implement a TCP/IP protocol. The network 120 may facilitate wireless or wired communication between a server 106 and any other local or remote computers, such as one or more clients 102 or other servers 106. The network 120 may be all or a portion of an enterprise or secured network. In another example, the network 120 may be a virtual private network (VPN) between the server 106 and the client 102 across a wired or wireless link. While illustrated as a single continuous network, the network 120 may be logically divided into various sub-nets or virtual networks without departing from the score of this disclosure, so long as at least a portion of the network 120 may facilitate communications between the server 106 and at least one client 102.

As described previously, a user can enter data into the user interface 104 on the client device 102. In an implementation, the data can be sent through the network 120 to one or more server devices 106. For example, the entered data 116 (e.g., "Entry Field A" 104a) can be sent through the network 120 to a server device 106. The entered data 116 can be used by the determination engine 108 to generate determined data 112 and determination information 114. The determination engine 108 may take as input the entered data value, and may determine an additional data value. In an implementation, the determination information 114 may describe a rule or rules that were used to generate the determined data from the entered data. For example, a value entered at "Entry Field A" 104a can be used by the determination engine 108 to determine a value for the "Determined Field A" field 104c or for the "Determined Field B" field 104d, or both. The determination engine 108 can also generate corresponding determination information, which may, for example, comprise a rule by which the determined value 104c or 104d was determined from the entered value 104a.

The determined data 112 and the determination information 114 can be sent through the network 120 for storage or display on one or more client devices 102. For example, the determined data 112 can be displayed in the GUI 104 as "Determined Field A" 104c, "Determined Field B" 104d, or both. In another example, the determination engine 108 may determine multiple values from the entered value, and may send them to the client over the network 120 for display in the user interface, such as in the determined fields 104c and 104d.

In some implementations, the determination information 114 can be shown as an entry in a table, or as a tooltip, as will be described in more detail below. While the determined data 112 and the determination 114 are shown stored at the server 106 in the illustrative implementation of FIG. 1, one or both may be stored at a client device 102 as well.

Figure 2:
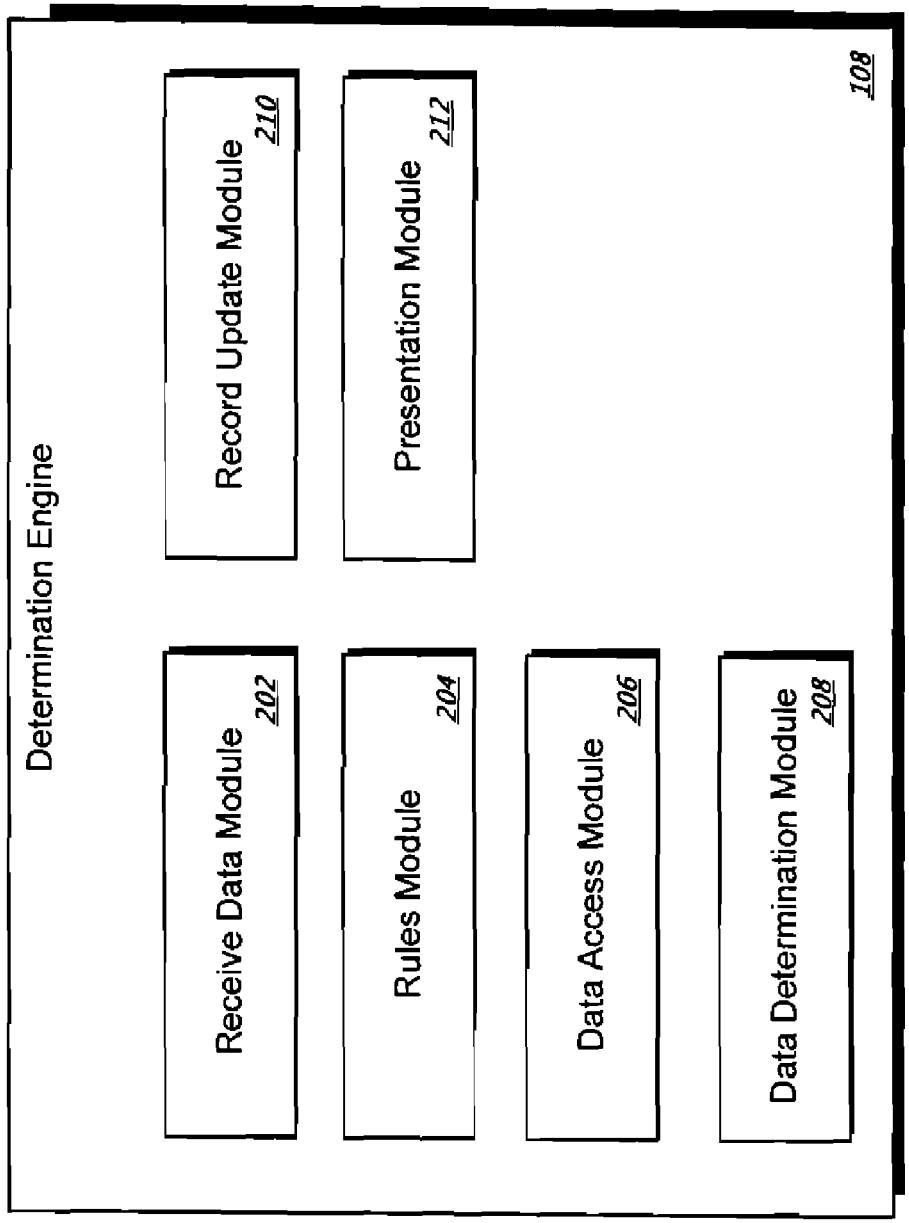
FIG. 2 is a block diagram of the exemplary determination engine of FIG. 1.

FIG. 2 is a block diagram of the exemplary determination engine 108 of FIG. 1. As described previously, the system 100 may use the determination engine 108 to generate determined data 112 and determination information 114 based on data received from the one or more clients 102. In this fashion, one or more data values may automatically be generated based on an entered input value. As such, the user may be spared from having to manually enter these one or more additional data values, and may be able to focus on other tasks at hand. In some implementations, determined data 112, determination data 114, or both may be generated external to the system 100 (FIG. 1).

Determination information 114 that pertains to the determined data 112 may be useful for downstream processing decisions. For example, the rule or method by which the data was automatically determined may be relevant and useful in ascertaining a confidence level or for subsequent processing decisions. Similarly, the entered data or an indication of the party entering the entered data may be useful in determining a confidence level or for subsequent processing decisions.

One such decision may be to update master data based on either determined data, determination information, or both. For example, the system may recognize that a determined data value is incorrect, and may then decide that the rule that led to generation of the incorrect determined data value may need modification. Suppose, for example, that master data relating to employee responsibilities for particular regions is not maintained properly. This may occur, for example, following a reorganization where employee responsibilities were changed, but have not yet been incorporated into the system. As part of the reorganization, an employee may have left the organization, yet may still be listed as responsible for a given region in the system information, and may thus be generated as a determined data value, despite having left the organization. The system or some external entity may recognize the error, and may accordingly update the master data. Similarly, if the system fails to generate a determined data value, the system or an external entity may recognize that a rule may need modification, and may accordingly modify the rule.

In the exemplary architecture shown in FIG. 2, the determination engine 108 includes a receive data module 202, a rules module 204, a data access module 206, a data determination module 208, a record update module 210, and a data presentation module 212. In an implementation, the receive data module 202 can receive data from the server 106 for processing. For example, the receive data module 202 can receive entered data 116 (see FIG. 1). The entered data 116 can be stored in memory or a storage device. For example, the entered data 116 can be stored in the persisted data 110, which can be stored on the server's hard drive or in a data repository elsewhere in the system 100.

The rules module 204 can be used to create, modify, and access rules. Rules can specify special relationships that the data can have. For example, a rule can specify that, under certain circumstances, a "buyer" address can be used as a "shipping" address. The rules can also specify how data can be determined. In the preceding example, the rule may specify that if a user enters the "buyer" address, then the value may be copied and used for the "shipping" address. As another example, a rule can specify how an employee responsible for a given region may be determined from an address falling within the region and maintained responsibilities for regions. These rules can be sent to the data determination module 208 for processing.

The data access module 206 can access persisted data 110. For example, once the data has been received by the receive data module 202, persisted data 110 can be read into memory and sent to the data determination module 208 for processing. Master data may be relevant for determining values in business transaction documents. In some implementations, the data access module 206 accesses data in other servers 106 or in a data repository. In other implementations, the data access module 206 may access data at a client site. Accessed data may be used to help generate determined data, according to an implementation.

The data determination module 208 can use rules accessed by the rules module 204 and data accessed from the data access module 206 to generate determined data 112. For example, the data determination module 208 can apply a rule or set of rules to data received from the receive data module 202 (e.g., entered data 116) or data accessed by the data access module (e.g., persisted data 110), or some combination of the two.

During the generation of determined data 112, the data determination module 208 also maintains a record of how the determined data 112 was automatically generated. In an implementation, this may involve maintaining the entered data and a rule utilized to generate determined data 112 from the entered data 116. In one example, the determination engine 108 may use information pertaining to a particular user entering data to generate determined data. For example, determined data 112 may be generated by deriving an employee responsible for a certain task from information pertaining to a user entering an order. In this case, the determination information 114 can be "From user," because this describes the manner in which the determined data was generated. Other examples generating determined data are described below. Once the determined data 112 and the determination information 114 have been generated, they may be sent to the record update module 210 and the presentation module 212 for further processing.

The record update module 210 can update data information in the persisted data 110 or in other storage locations. For example, after the data determination module 208 has generated the determined data 112, the record update module 210 can receive and store the determined data 112 with the persisted data 110. The record update module 210 can also store the determination information 114 with the determined data 112 that is generated by the data determination module 208. As described previously, the determination information 114 may be generated by the data determination module 208. By virtue of the manner in which it stores the various information, the record update module 210 may create associations among the various entities. These associations, such as associations between the determined data 112 and the entered data 116, or between the determined data 112 and the determination information 114, or between the determined data 112 and both the entered data 116 and the determination information 114 may permit improved access to the information. As such, the system 100 may be able to readily access the information and utilize it to perform an action, such as making a decision.

Presentation module 212 can send the determined data 112 and the determination information 114 to the clients 102 through the network 120 for display, storage, or other processing, according to an implementation. For example, the presentation module 212 can send the "Determined Entry A" value 104c or the "Determined Entry B" value 104d to a client device 102 (see FIG. 1). The presentation module 212 can also specify the portion of the GUI 104 that the sent data is to occupy (e.g., determined data 112 or determination information 114). The presentation module 212 can also specify how the determination information 114 is presented to the user. For example the determination information 114 can be presented as a tooltip, an additional column in a table, or has context sensitive help, to list just a few examples. If, for example, the determination information 114 is presented as a tooltip, the presentation module 212 can generate the tooltip's text and specify the mouse-over duration before the tooltip is visible.

As described previously, the determination engine 108 can use many different determination methods. Determination methods include, but are not limited to, evaluating responsibilities to determine an employee responsible for a given task, deriving a location from an address, deriving an organization from responsibilities, evaluating relationships in master data, evaluating an organizational structure to determine a particular organization (e.g., a sales organization within a hierarchy), determining a processor from a service team, deriving a text or attachment from master data maintained at a product entered in the document, deriving a text or attachment from data maintained at a business partner entered, finding an employee responsible from an indication of the user entering the order, and copying one party from another party. This list of determination methods is intended to be illustrative. Each of the aforementioned determination methods may comprise one or more determination rules, according to one implementation.

These example determination methods can be more generally grouped into exemplary categories, such as, for example, deriving information from an entered location; deriving information from an entered party, organization, organizational structure, or service team; deriving information from data maintained at an entered object location; deriving information from an indication of the user entering the data; and copying information from one party to another party.

In an implementation, an employee responsible for a given task, account, or territory may be determined using a rule that takes as input an entered "ship-to location" and uses regional attributes to make the determination. Alternatively, the "ship-to location" may be copied to another field.

An example of deriving information from an entered location may include determining an employee from a location. For example, by applying an appropriate rule, the determination engine 108 may determine that employee "Jones" is responsible for a given account using an entered location, such as "1 MyPC Way, New York, N.Y." Once the location is determined, information describing other data associations can be determined. For example, if "Jones" was previously entered as being responsible for the northeast region, he may be determined to be the employee responsible for "1 MyPC Way, New York, N.Y."

An example of deriving information from an entered party, organization, organizational structure or service team may include evaluating relationships in persisted data 110. For example, if "John Doe" is maintained as "the employee responsible for" at "MyPC Corporation," and if "MyPC Corporation" includes "has the bill-to" of "Billing Corporation," then if "John Doe" was entered for a sales order, "Billing Corporation" may be determined for the bill-to partner. In this example, "MyPC Corporation" may be a business partner or party. An example of deriving information from an entered organization may include receiving an entered sales unit, such as "E-Selling," and deriving from this a sales area. The sales area may include one or more of a sales organization, a distribution channel, or a division. Then, master data for "MyPC Corporation," for example, may be read to determine a sales-area-dependent relationship, such as "has product recipient," to get the person receiving the goods. In this example, "MyPC Corporation" may have several goods recipients depending on the sales area. Another example may include receiving an entered service team and deriving an employee responsible from information describing employees working on positions of this service team.

An example of deriving a text or an attachment may include deriving an appropriate user manual from a buyer, from a region associated with the buyer, or from the product sold, etc. For instance, it may be determined that a user manual written in German is appropriate for products sold to buyers in Germany, whereas a user manual written in Japanese may be determined to be appropriate for products sold to buyers in Japan.

As described above, an employee responsible for a given region may be determined using responsibilities for regions and a region of a particular buyer. However, in a circumstance where responsibility information is incomplete or outdated, data may be determined based on other considerations, such as a user entering an order. For example, if a user enters an order for a buyer located in Los Angeles, Calif., for example, a search for the responsible employee may turn up empty if responsibility data is incomplete or outdated. In this case, the system may use the employee entering the order as determined data to populate a field in a document. This rule may be applicable, in some implementations, for responsibilities relating to opportunities or leads, as it may be the case that a person entering a lead into the system is frequently responsible for the lead.

An example of copying one party from another party may include copying the bill-to party from the buyer data, as described above. For example, if "MyPC Corporation" is the buyer, then the "bill-to" field can be copied from the address for "MyPC Corporation," according to an implementation.

The determination method can include one or more steps and can contain branching. For example, determining the employee responsible can be determined using the steps of: 1) using the master data of the buyer, 2a) finding the employee using a rule or rules specifying responsibilities, or 2b) deriving the employee responsible using a rule or rules that take as input an indication of a user entering an order.

In some implementations, each step can be executed sequentially. For example, in the previous set of example steps, if an employee is stored in the persisted data as being directly responsible, the determined data 112 may include the employee (e.g., "John Doe") and the determination information 114 may specify "Relationships of Buyer." Both the determined data 112 and determination information 114 can be stored in the persisted data 110.

Otherwise, if an employee is not stored in the persisted data as directly responsible, a second step of finding the employee using rules specifying responsibilities can be executed. In this case, the determined data 112 may still include the employee "John Doe," but because an alternative determination method is being utilized, the determination information 114 may be "Responsibilities of Buyer Address." Again, the determined data 112 and determination information 114 can be stored in the persisted data 110.

If both the employee is not stored in the persisted data 100 and the user responsible is unable to be determined from the responsibilities, then a third step of deriving the employee responsible from rules defined by the user entering the order may be executed. In this case, the determined data 112 may still include the employee "John Doe," but the determination information 114 may be "From user." As before, the determined data 112 and determination information 114 can be stored in the persisted data 110.

The user also may have the option of overriding determined information by manually editing the retuned data. This may be useful, for example, if the determination engine 108 does not return a value or if a value returned is not what the user expected, to name two examples. If the user manually changes the data, the record update module 210 may update the persisted data 110 to reflect the change. In some implementations, if the user manually changes the data, the determination information 114 can be stored as "Manually Entered."

Figure 3:
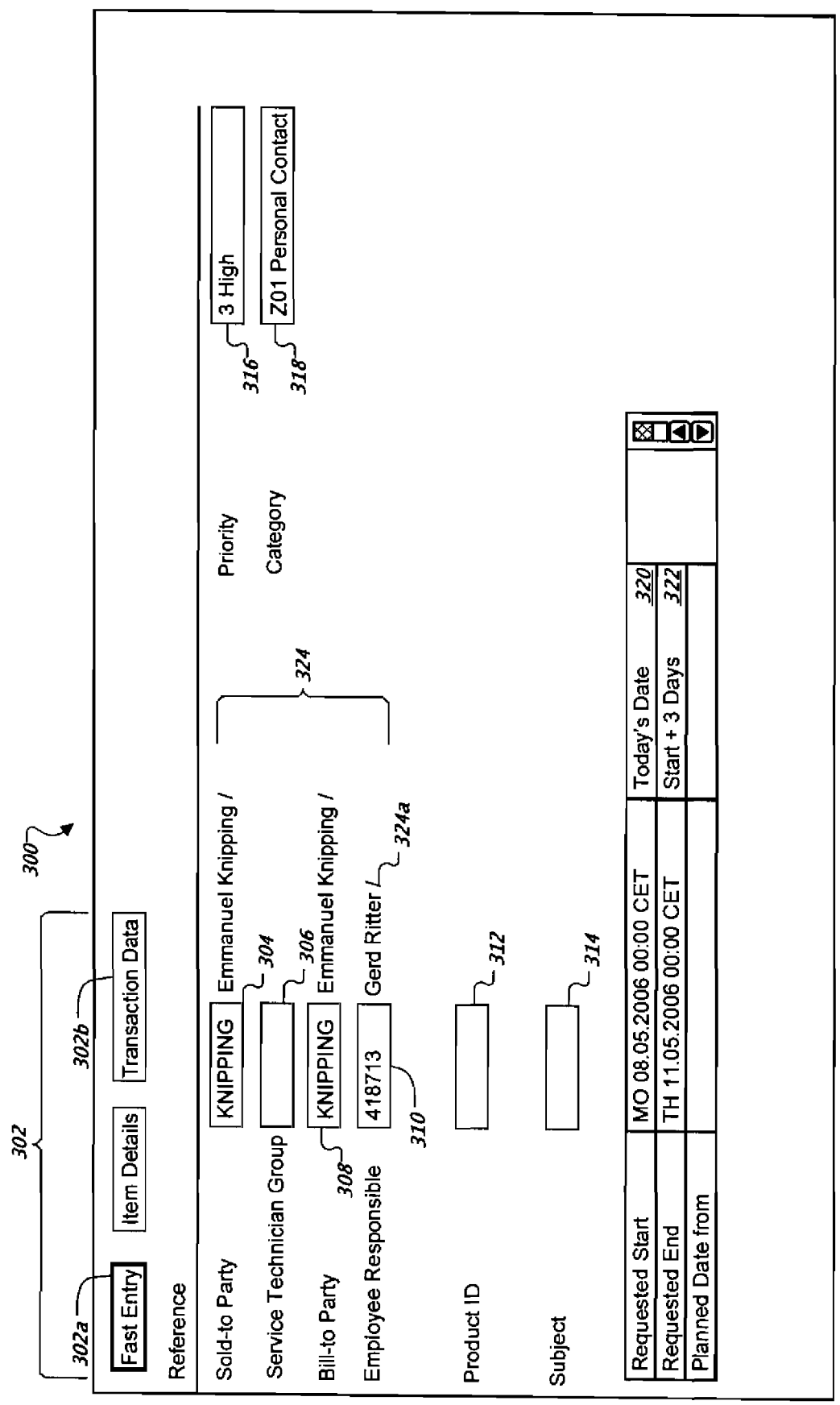
FIGS. 3-5 are screen shots of exemplary user interfaces that can be used for automatic data determination and association.

FIG. 3 is a screen shot of an exemplary user interface 300 that can be used for automatic data determination and association. As described previously, the system can receive entered data 116 from the user and use the determination engine 108 to generate additional determined data 112 and determination information 114 from the entered data 116. The determined data 112 can be generated using the entered data 116 and a rule or set of rules. The determination engine 108 is capable of determining more than one item of determined data upon receipt of the entered data 116. The determination engine 108 can also populate the user interface 300 with the data that it determines. In this fashion, additional data values may be automatically generated and displayed in the user interface 300 following an entry by a user of one or more data values in the user interface 300.

Figure 4:
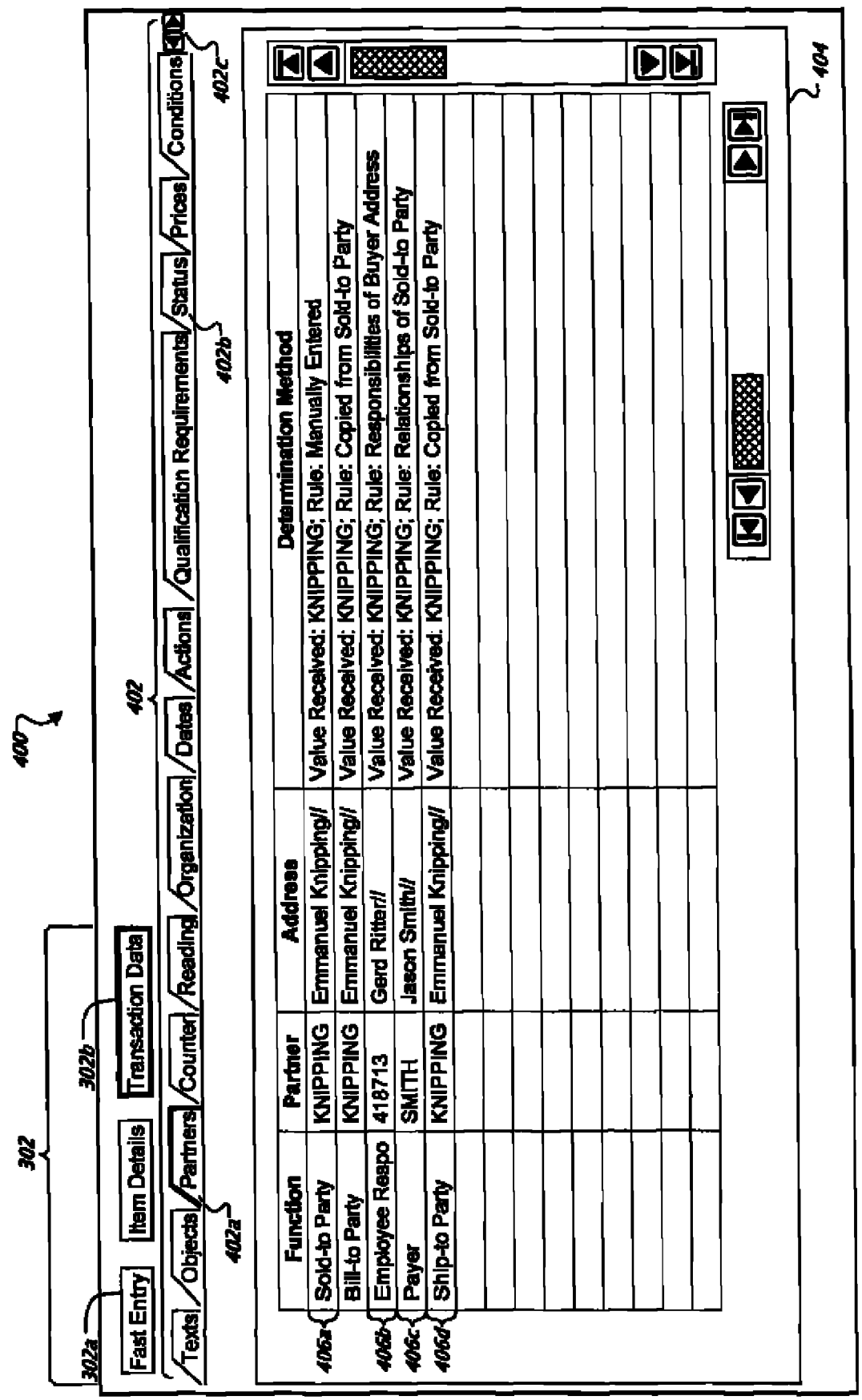

The user interface 300 includes a set of buttons 302. The buttons 302 allow the user to navigate between a set of different user interface views. The different views may include different types of information. For example, if the user clicks on button 302a, the display can change to the view as illustrated by FIG. 3. If instead, the user clicks on button 302b, the display can change to the view as illustrated by FIG. 4, described below.

The user interface 300 also includes one or more data entry fields, as illustrated by boxes 304-322. In an implementation, the user can enter information into a field, and the system 100 can use the entered data to determine other data that can be used to populate other entry fields. For example, if the user enters "KNIPPING" into a "Sold-to Party" entry field 304, the determination engine 108 can use the entered information to determine a "Bill-to Party," and can populate a corresponding field with this information. In the illustrated example, the system may determine, based on the entered data, that the "Bill-to Party" is also "KNIPPING," as shown by the entry in field 308.

In some implementations, more than one entry field can be determined and populated. Using the previous example, the determination engine 108 may also determine an "Employee Responsible" using the data originally entered by the user. In the illustrated example, the "Employee Responsible" is determined to be "418713," which may correspond, for example, to an employee number, from the entered data "KNIPPING," as shown by the entry in field 310.

Additionally, in some implementations, determined data can be iteratively used to determine other data. For example, once the determination engine 108 determines the employee responsible (e.g., "418713"), the determination engine can the determined data or information derived from it to determine one or more additional data values. For example, if "Gerd Ritter" is the name of the employee that corresponds to the determined employee ID number (e.g., 418713), then an engine 108 may, in an implementation, access data, such as contact information, that classifies "Gerd Ritter" as a personal contact. This information may then be populated in the interface 300 as shown by the entry in field 318.

As described previously, it may also be possible for the user to enter information after one or more items have been determined by the determination engine 108. For example, after the "Category" of "Z01 Personal Contact" has been determined, the user may enter a "Priority" value of "3 High," as shown by the entry in field 316. This may cause the determination engine 108 to determine additional information. For example, the "Priority" value of "3 High" may cause the determination engine 108 to generate a requested start data and a requested end data, which may be represented in the interface 300 as determined data of "Today's Data" and "Start+3 Days" in entry fields 320 and 322, respectively. A field may also be determined by an external system in some implementations. In this case, determination information 114 may include "Determined by external system X," for example. This determination information 114 may be provided by the external system (here, system X) in some implementations, or may alternatively be provided by the system 100 in other implementations.

The user interface as shown in FIG. 3 also includes text fields. Text fields may be optional and may be used to provide context for data appearing in entry fields, according to an implementation. A text field may be included for none, some, or all of the available entry fields in various implementations. These text fields, as show by bracket 324, can provide the user with additional information regarding the data in the entry fields 304-322. For example, the name "Gerd Ritter" can be provided for the "Employee Responsible" of "418713" 310, as shown by text field 324a. This may allow the user to see items as they are represented in the persisted data (e.g., "418713" for "Employee Responsible") and may also allow the user to see a string representation of the data, which may improve readability.

As described previously, any of the data entry fields 304-322 can be used to both enter data and populate determined data 112. For example, entry field 306 (i.e., the "Service Technician Group" field), can be manually edited by the user, or automatically determined by the determination engine. In either case, the entered data or the determined data can be used by the determination engine 108 to determine other information. The fields shown are intended to be illustrative, and it will be understood that the system 100 may determine an appropriate data value for any of the provided fields using data entered by a user, a rule or set of rules, or data accessed within the system 100.

FIG. 4 is a representation of an exemplary user interface 400 that can be used to provide determination information to the user. As described previously, the determination engine 108 can generate both determined data 112 and determination information 114 (see FIG. 1). The determination information 114 can specify a method by which the determined data 112 is generated, according to an implementation. Determination information 114 may be used by the system 100 or by the user, and in an implementation includes the entered data 116 and a rule used to generate the determined data 112. By providing the user with the determination methods (e.g., determination information 114), the user may be better informed concerning how a particular data value was determined by the system 100. If desired, the user can manually modify entry fields, including this values that were that are automatically determined by the system 100. By providing the rule used and the data that the rule was applied to, the determination information 114 may allow the user an efficient mechanism to validate that the automatic generation is inline with the users expectations. By viewing the determination information 114 that describes how the determined data 112 was generated, the user may, for example, have more confidence in the determined data than they would have if they were unable to conveniently view the determination information 114.

In addition to the set of buttons 302 described with reference to FIG. 3, the user interface 400 also includes a set of tabs, as illustrated by tabs 402. These tabs 402 can be used to access different types of information, which may include different types of determination information 114. For example, a "Partner" tab 402a, highlighted in the interface 400, includes a table 404 that displays data. The data in the table 404 can be entered data 116, determined data 112, or both. As shown, the data includes determination information 114 in a rightmost column labeled "Determination Method-"for items related to transactions, some of which appeared in FIG. 3.

The table includes a first column labeled "Function," a second and third column labeled "Partner" and "Address," respectively, and the aforementioned determination data column labeled "Determination Method." In this example, a first row 406a of the table 404 includes a "Sold-to Party" entry in the first column and a "KNIPPING" entry in the second column. As can be seen by referring back to FIG. 3, row 406a describes the entry field 304 (i.e., "KNIPPING") and what the information pertains to (i.e., "Sold-to Party"). As shown in row 406a, the determination information for this entry includes a "Determination Method" of "Value Received: KNIPPING; Rule: Manually Entered." Thus a user or the system may be apprised that the value was manually entered, in this example.

A second row 406b of the table 404 includes an "Employee Respon[sible]" entry in the first column, a "418713" entry in the second column, and a "Gerd Ritter" entry in the third column. As can be seen by referring back to FIG. 3, row 406b describes the entry field 310 (i.e., "418713"), the text field 324a (i.e., "Gerd Ritter"), and what the information pertains to (i.e., "Employee Responsible"). As shown in row 406b, the determination information for this entry includes a "Determination Method" of "Value Received: KNIPPING; Rule: Responsibilities of Buyer Address." As such, the determination information includes the entered value (e.g., "KNIPPING," which in this case was entered in input field 304, see FIG. 3), and a rule used to determine the determined information in the row 406b is the employee number "418713" (corresponding to the entry in field 310, see FIG. 3), signifying the employee responsible. In this example, a value of KNIPPING was received and the determination engine 108 used a rule of "Responsibilities of Buyer Address" to determine the value of "418713."

Below row 406b in the table 404 are two additional rows 406c and 406d. Row 406d specifies "KNIPPING" as a value for a "Ship-to party" field. This field, while it did not appear in FIG. 3, may nevertheless have a data value automatically generated by the determination engine 108 after receiving entered data 116. That is, a data field need not be presently displayed in an interface and yet still may benefit from generation of determined data 112 and associated determination information 114. For example, as shown in the determination information column of row 406d, the determined value "KNIPPING" (shown in the "Partner" column) was determined using a rule of "Copied from sold-to party," and the entered value "KNIPPING." That is, the entered data was copied as determined data into the "Ship-to Party" field. Row 406c specifies "SMITH" as a value for a "Payer" field. This field similarly did not appear in the interface of FIG. 3, but may nevertheless have a data value automatically generated by the determination engine 108 after receiving entered data 116. For example, as shown in the determination information column of row 406c, the determined value "SMITH" (shown in the "Partner" column) was determined using a rule of "Relationships of Buyer" and the entered value "KNIPPING." As another example, if the user selects the "Status" tab 402b, the user may see other items from the data displayed in FIG. 3, such as other determined data values, along with corresponding determination information organized in a similar fashion (e.g., a table similar to the table 404). The data displayed may include, for example, the "Priority" information, as entered by the user into entry field 316 or the "Requested Start" information as determined by the determination engine 108 and displayed in entry field 320. Determination Methods may also be included in the "Status" tab 402b. For example, the determination information 114 describing the "Priority" data may be "Value Received: 3 High; Rule: Entered By User," and this information may be conveniently stored and presented with the determined data 112, such as in a table similar to table 404.

In addition to the tabular view illustrated by FIG. 4, the determination information 114 can be presented to the user in other ways. For example, the determination information 114 can be presented to the user as a pop-up or a modal dialog box. For example, if the user selects an entry field (e.g., entry field 310) and presses a key (e.g., "F1"), a pop-up message with the text "Value Received: KNIPPING; Rule: Responsibilities of Buyer Address." may appear. Another example is a tooltip, which can appear, for example, if the user hovers the cursor over a field, such as a field for which determined data was generated or an entry field. Tooltips are described in more detail in reference to FIG. 5. Also, determination information may include more or less information that what is illustratively presented in FIG. 4. For example, in some implementations only the rule or rules used to determine the determined data may be provided. In other implementations only the entered value may be provided. In yet other implementations, information different from the entered value or the rule may be provided, and combinations of the above are further possible.

Figure 5:
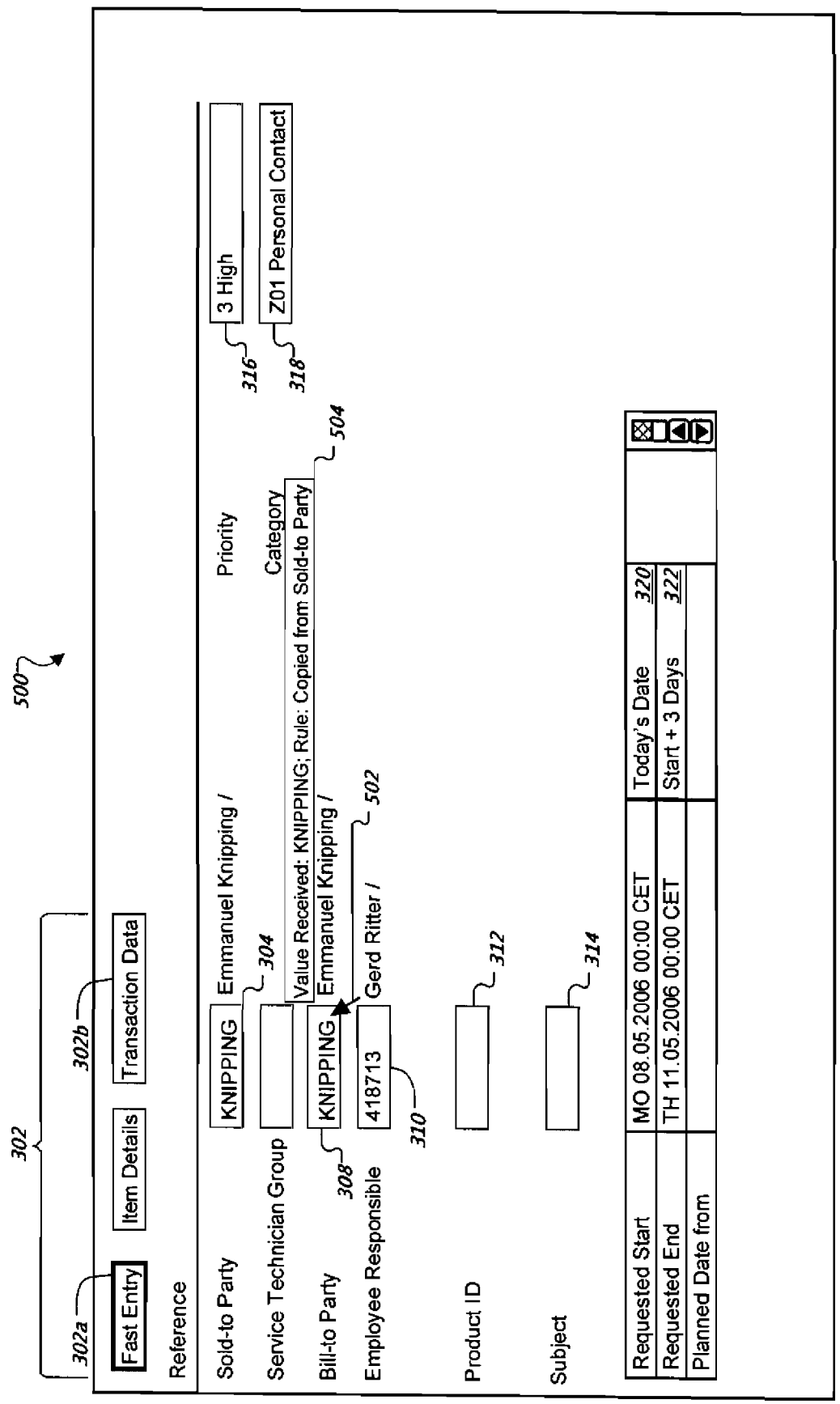

FIG. 5 is an exemplary user interface 500 that can be used to provide determination information to the user using a tooltip. As described previously, a tooltip can appear if the user hovers a cursor over a field. The tooltip can contain the determination information 114 that is generated by the determination engine 108, which may provide a convenient and minimally intrusive manner in which to view information. Because the tooltip may appear only as long as the user hovers the cursor over an entry field in the user interface, it allows the user to view the determination information 114 without having to change views. In some implementations, the tooltip background can be transparent or partially transparent which can further reduce the invasiveness of the tooltip and allow the user to see more of the user interface while still viewing the determination information 114.

The user interface 500 shown in FIG. 5 is similar to the user interface 300 described above with reference to FIG. 3. If a user hovers a cursor for a predetermined period of time, a tooltip can appear. For example, if the user hovers the cursor 502 over the entry field 308 for 250 milliseconds, a tooltip 504 may appear. The tooltip 504 can display the determination information 114 as determined by the determination engine 108. This determination information 114 may typically be the same determination information 114 that may be represented using other display mechanisms, although in some implementations differing amounts of determination information 114 may be presented depending on the presentation method used. For example, the determination information 114 in FIG. 4 may be represented as a tooltip. As shown in FIG. 5, the determination information 114 "Value Received: KNIPPING; Rule: Copied from sold-to party" in table 404 is shown as tooltip 504.

Tootips can also appear on entry fields that are not currently populated. In such cases, the tooltip can be populated with a well-defined response. For example, the tooltip can be empty, contain a message (e.g., "None currently available"), or exhibit some other well-understood behavior (e.g., in some implementations, empty entry fields may not generate a tooltip). Determination information 114 may be presented in a number of different ways. By way of non-limiting example, determination information may be presented in a table or similar presentation structure (such as table 404), as a modal window, as a tooltip (such as tooltip 504, as input to a process (whether displayed on an interface or not)), as included in an email or other communication, or as information to be stored for later use.

Figure 6:
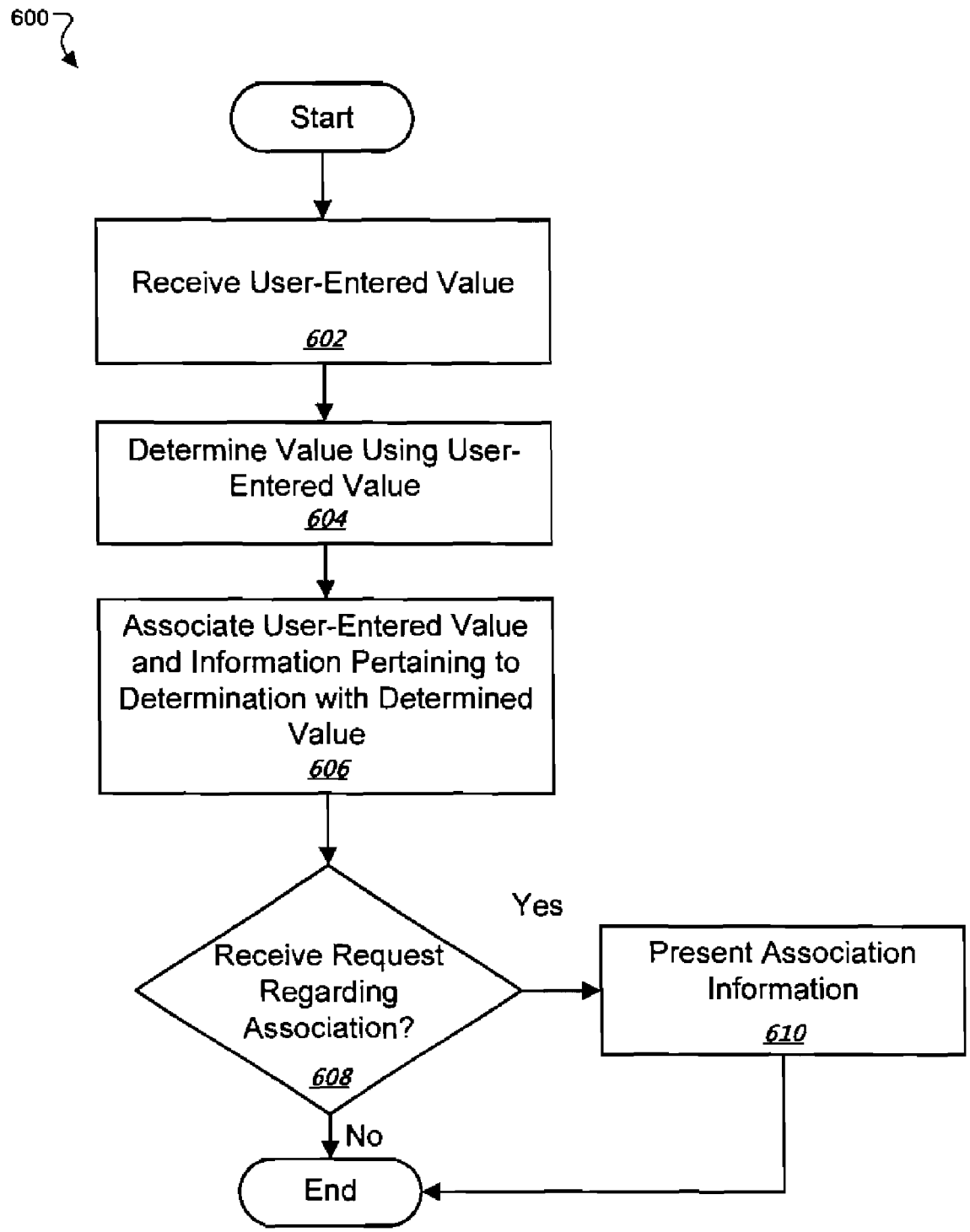
FIG. 6 is a flow chart of exemplary operations that can be performed to automatically determine data and associate the data with information pertaining to the determination.

FIG. 6 is a flow chart of exemplary operations 600 that can be performed to automatically determine data and associate the data with information pertaining to the determination. As described previously, this association may allow the system 100 to provide useful information, usable by the system 100 or a user. For example, the user may be able to visualize how the determined data 112 was generated, in an implementation. Examples of this feedback have been described previously in reference to FIGS. 4 and 5.

In step 602, the system 100 can receive a value entered by a user. The value can be received under guidance of a graphical user interface for association with a field of a document. For example, referring now to FIG. 3, the user interface 300 can allow the user to enter the value "KNIPPING" into entry field 304, and the value can be received by the determination engine 108. When the user enters the data into entry field 304, the data can be automatically associated with the value "Sold-to Party" because the user interface can specify a mapping between the entry field and the data association.

In step 604, the system 100 can use the determination engine 108 to generate one or more determined values using the entered data. For example, referring now to FIG. 3, the entered data "KNIPPING" can be used by the determination engine 108 to generate the "Bill-to Party" value of "KNIPPING," as shown in the entry field 308. The determination engine 108 can generate more than one value based on the entered data in step 602. For example, referring again to FIG. 3, the determination engine 108 may also be able to generate the "Employee Responsible" value of "418713," as shown in the entry field 310, the "High" value in field 316, the "Personal Contact" value in field 318, or values for any of fields 312, 314, 320, or 322.

As an intermediate step (not shown in FIG. 6), determined data can be associated with at least another field of the document. For example, referring again to FIG. 3, the "KNIPPING" and "418713" values can be associated with their respective entry fields 308 and 310. The association can be automatically determined because the rules can specify associations. For example, the rule "Copy from sold-to party", as described previously, can define that data derived from the rule is associated with the "Bill-To Party" entry field 308.

In step 606, the system can associate data determined by the determination with the user-entered value, with data pertaining to the determination, or with both. An example of this is shown in the rightmost column of the table 404 in FIG. 4. The system 100 can store such associations or populate portions of the user interface with determination information 114. For example, referring to FIG. 4, the system can populate the columns for table 404 that contain determination information 114. As another example, referring to FIG. 5, the system 100 can populate the information pertaining to a tooltip. The determination information 114 in the table or the tooltip can be viewed if the user enters a request, as described below.

In step 608, if the system receives a request from the user it can present the association information at step 610. For example, if the user is attempting to invoke a tooltip by hovering a cursor over an entry field (e.g., as shown in FIG. 5), the system can respond by displaying the tooltip in step 610. As another example, referring to FIGS. 3 and 4, if the user selects the "Transaction Data" button 302b in FIG. 3, the system may respond by displaying the user interface 400 (FIG. 4) in step 610.

The system can also receive a request from another system (e.g., another application program). In such a case, the presentation of the information may involve displaying the information on a display screen, emailing the information to an email address, storing the information in a storage location, providing the information as input to a process, and the like.

Figure 7:
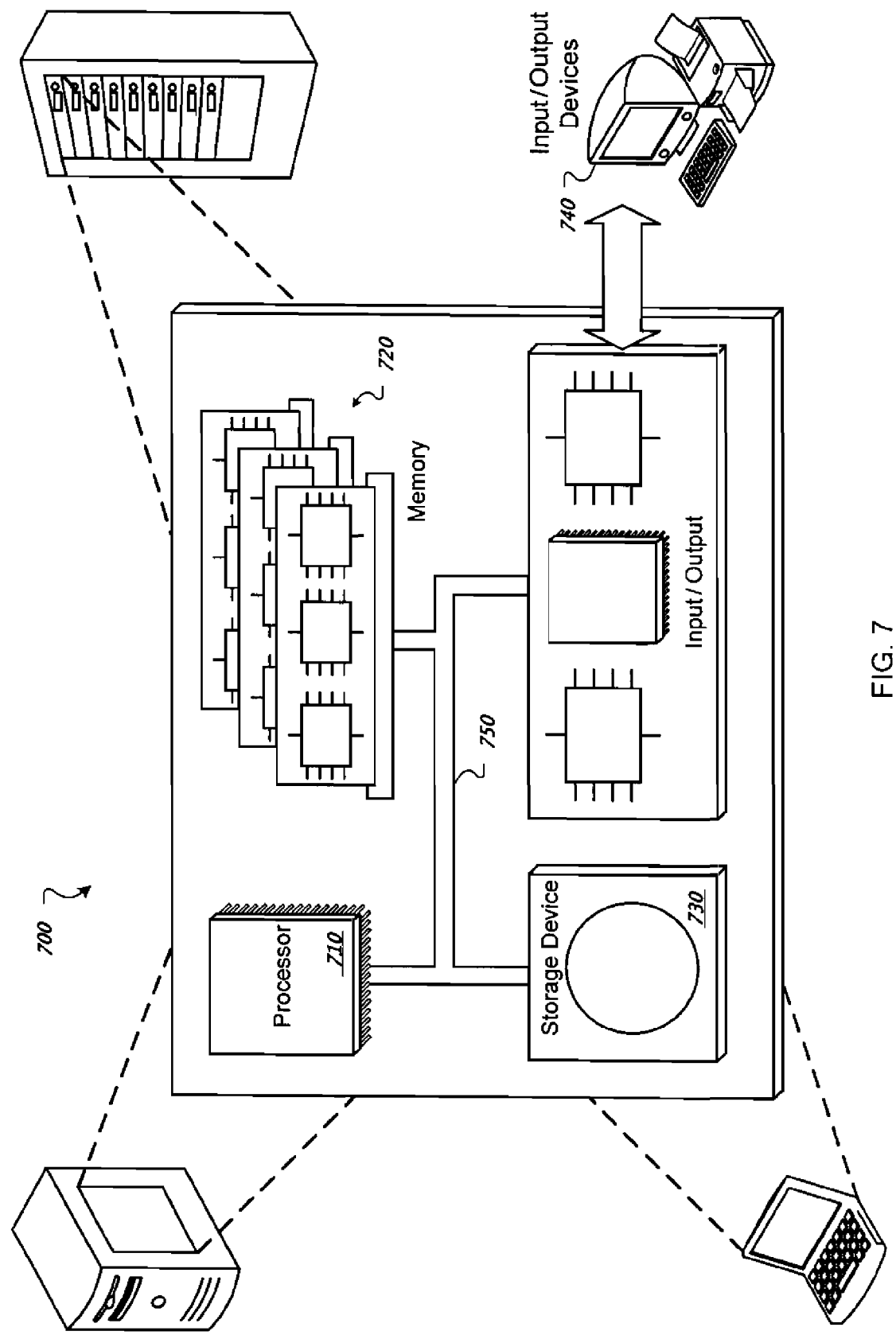
FIG. 7 is a block diagram of a computing system that can be used in connection with computer-implemented methods described in this document.

FIG. 7 is a schematic diagram of a generic computer system 700. The system 700 can be used for the operations described in association with any of the computer-implement methods described previously, according to one implementation. The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other embodiments are within the scope of the following claims.

What is claimed is:

1. A computer-implemented method of documenting and displaying an indication of a rule used to determine a value for entry in a field of an electronic document, the method comprising:

receiving a first value that a user enters under guidance of a graphical user interface, the first value entered for association with a first input field of a document;

accessing a rule, from a plurality of predefined rules stored in an electronic storage device, the accessed rule selected based on the rule having been assigned to the first value, each of the rules specifying a respective procedure for obtaining a determined value based on a specific entered value;

determining, using the received first value and the procedure specified by the accessed rule, a second value to be automatically associated with at least another input field of the document in response to receiving the first value, and associating a name of the accessed rule with the second value;

storing, in a database record associated with the document, (i) the received first value, and (ii) the determined second value with the associated name of the accessed rule; and displaying on a display device a determination information overview regarding the document, the determination information overview indicating the first value as having been user entered, and indicating the second value as having been determined using the accessed rule assigned to the second value;

wherein the first value, the second value, and the name of the accessed rule assigned to the second value are displayed following an access of the database record associated with the document to retrieve the stored first value and the stored second value with the assigned name of the accessed rule;

wherein the procedure for obtaining a determined value using an entered value further includes using master data accessed from an electronic storage location, the master data being different than the received first value, and wherein determining the second value includes using both the received first value and the accessed master data.

2. The computer-implemented method of claim 1, further comprising displaying in the graphical user interface the determined second value in the at least another input field of the document.

3. The computer-implemented method of claim 2, further comprising receiving, after displaying the determined second value, a value that a user enters under guidance of the graphical user interface, and replacing the determined second value with the user-entered value.

4. The computer-implemented method of claim 1, wherein the accessed rule comprises a plurality of rules applied consecutively to determine the second value to be automatically associated with the at least another field of the document.

5. The computer-implemented method of claim 1, further comprising making a subsequent decision based on the accessed rule.

6. The computer-implemented method of claim 1, further comprising making a subsequent decision based on the name of the accessed rule.

7. The computer-implemented method of claim 1, wherein the determined second value is an attachment.

8. The computer-implemented method of claim 1, wherein the received first value and the name of the accessed rule are displayed in the graphical user interface when the user makes a selection associated with the at least another input field.

9. The computer-implemented method of claim 8, wherein the received first value and the name of the accessed rule are displayed as a tool tip in the graphical user interface, and wherein the selection comprises hovering a pointing indicator in the user interface over the at least another input field of the document.

10. The computer-implemented method of claim 1, further comprising receiving, from an external system, a third value to be automatically associated with at least another third input field of the document, and storing, in a database record associated with the document, information indicating how the third value was determined, comprising a name of a rule used in determining the third value for the at least another third input field, the information received from the external system.

11. The computer-implemented method of claim 1, further comprising receiving a fourth value that a user enters under guidance of the graphical user interface for association with a fourth input field of a document, and assigning to the fourth value a rule name that indicates manual entry.

12. A computer program product tangibly embodied in a computer-readable storage medium and comprising instructions that when executed by a processor perform a method for documenting and displaying an indication of a rule used to determine a value for entry in a field of an electronic document, the method comprising:

receiving a first value that a user enters under guidance of a graphical user interface, the first value entered for association with a first input field of a document;

accessing a rule, from a plurality of predefined rules stored in an electronic storage device, the accessed rule selected based on the rule having been assigned to the first value, each of the rules specifying a respective procedure for obtaining a determined value based on a specific entered value;

determining, using the received first value and the procedure specified by the accessed rule, a second value to be automatically associated with at least another input field of the document in response to receiving the first value, and associating a name of the accessed rule with the second value;

storing, in a database record associated with the document, (i) the received first value, and (ii) the determined second value with the associated name of the accessed rule; and displaying on a display device a determination information overview regarding the document, the determination information overview indicating the first value as having been user entered, and indicating the second value as having been determined using the accessed rule assigned to the second value;

wherein the first value, the second value, and the name of the accessed rule assigned to the second value are displayed following an access of the database record associated with the document to retrieve the stored first value and the stored second value with the assigned name of the accessed rule;

wherein the procedure for obtaining a determined value using an entered value further includes using master data accessed from an electronic storage location, the master data being different than the received first value, and wherein determining the second value includes using both the received first value and the accessed master data.

13. The computer program product of claim 12, further comprising instructions that when executed display in the graphical user interface the determined second value in the at least another input field of the document.

14. The computer program product of claim 13, further comprising instructions that when executed receive, after displaying the determined second value, a value that a user enters under guidance of the graphical user interface, and replace the determined second value with the user-entered value.

15. The computer program product of claim 12, wherein the accessed rule comprises a plurality of rules applied consecutively to determine the second value to be automatically associated with the at least another field of the document.

16. The computer program product of claim 12, further comprising instructions that when executed make a subsequent decision based on the accessed rule.

17. The computer program product of claim 12, further comprising instructions that when executed make a subsequent decision based on the name of the accessed rule.

18. The computer program product of claim 12, wherein the determined second value is an attachment.

19. The computer program product of claim 12, wherein the received first value and the name of the accessed rule are displayed in the graphical user interface when the user makes a selection associated with the at least another input field.

20. The computer program product of claim 19, wherein the received first value and the name of the accessed rule are displayed as a tool tip in the graphical user interface, and wherein the selection comprises hovering a pointing indicator in the user interface over the at least another input field of the document.

21. The computer program product of claim 12, further comprising instructions that when executed receive, from an external system, a third value to be automatically associated with at least another third input field of the document, and store, in a database record associated with the document, information indicating how the third value was determined, comprising a name of a rule used in determining the third value for the at least another third input field, the information received from the external system.

22. A computer-implemented method of documenting and displaying an indication of a rule used to determine a value for entry in a field of an electronic document, the method comprising:
  receiving a first value that a user enters under guidance of a graphical user interface, the first value entered for association with a first input field of a document;
  accessing a rule, from a plurality of predefined rules stored in an electronic storage device, the accessed rule selected based on the rule having been assigned to the first value, each of the rules specifying a respective procedure for obtaining a determined value based on a specific entered value;
  determining, using the received first value and the procedure specified by the accessed rule, a second value to be automatically associated with at least another input field of the document in response to receiving the first value, and associating a name of the accessed rule with the second value;
  storing, in a database record associated with the document, (i) the received first value, and (ii) the determined second value with the associated name of the accessed rule;
  displaying on a display device a determination information overview regarding the document, the determination information overview indicating the first value as having been user entered, and indicating the second value as having been determined using the accessed rule assigned to the second value; and
  receiving, from an external system, a third value to be automatically associated with at least another third input field of the document, and storing, in a database record associated with the document, information indicating how the third value was determined, comprising a name of a rule used in determining the third value for the at least another third input field, the information received from the external system;
  wherein the first value, the second value, and the name of the accessed rule assigned to the second value are displayed following an access of the database record associated with the document to retrieve the stored first value and the stored second value with the assigned name of the accessed rule.

23. A computer program product tangibly embodied in a computer-readable storage medium and comprising instructions that when executed by a processor perform a method for documenting and displaying an indication of a rule used to determine a value for entry in a field of an electronic document, the method comprising:
  receiving a first value that a user enters under guidance of a graphical user interface, the first value entered for association with a first input field of a document;
  accessing a rule, from a plurality of predefined rules stored in an electronic storage device, the accessed rule selected based on the rule having been assigned to the first value, each of the rules specifying a respective procedure for obtaining a determined value based on a specific entered value;
  determining, using the received first value and the procedure specified by the accessed rule, a second value to be automatically associated with at least another input field of the document in response to receiving the first value, and associating a name of the accessed rule with the second value;
  storing, in a database record associated with the document, (i) the received first value, and (ii) the determined second value with the associated name of the accessed rule;
  displaying on a display device a determination information overview regarding the document, the determination information overview indicating the first value as having been user entered, and indicating the second value as having been determined using the accessed rule assigned to the second value; and
  receiving, from an external system, a third value to be automatically associated with at least another third input field of the document, and storing, in a database record associated with the document, information indicating how the third value was determined, comprising a name of a rule used in determining the third value for the at least another third input field, the information received from the external system;
  wherein the first value, the second value, and the name of the accessed rule assigned to the second value are displayed following an access of the database record associated with the document to retrieve the stored first value and the stored second value with the assigned name of the accessed rule.

* * * * *